Nov. 10, 1964 J. A. LAUCK 3,156,191
SEALING MEANS FOR PUMPS AND MOTORS
Filed Dec. 23, 1960 3 Sheets-Sheet 1
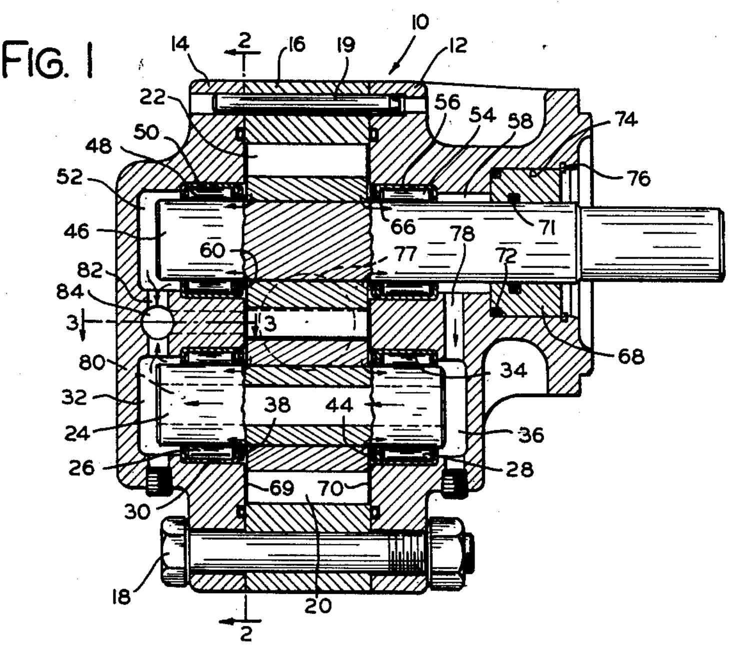
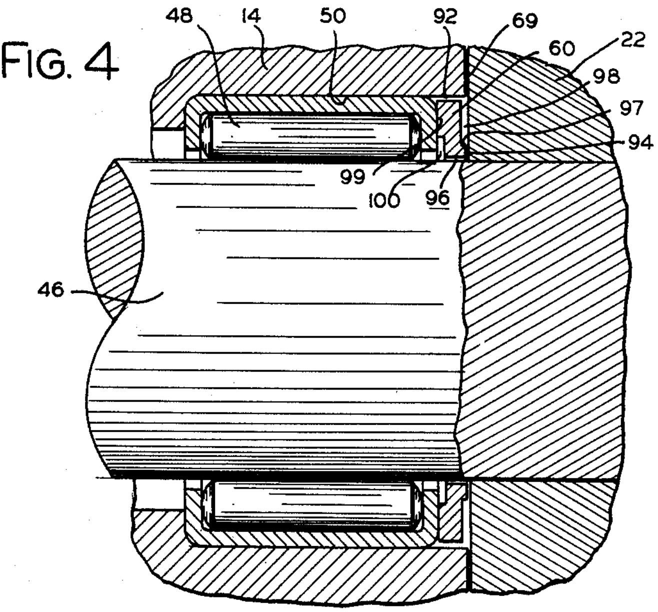
INVENTOR.
JOHN A. LAUCK
BY J. C. Wiessler
ATTORNEY

INVENTOR.
JOHN A. LAUCK

BY J. C. Wiessler

ATTORNEY

SEALING MEANS FOR PUMPS AND MOTORS
Filed Dec. 23, 1960 3 Sheets-Sheet 3
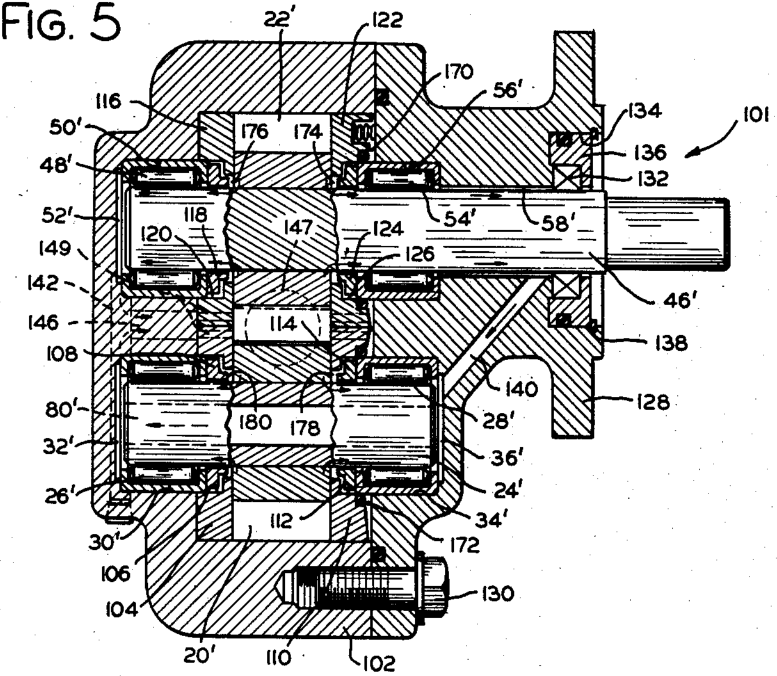
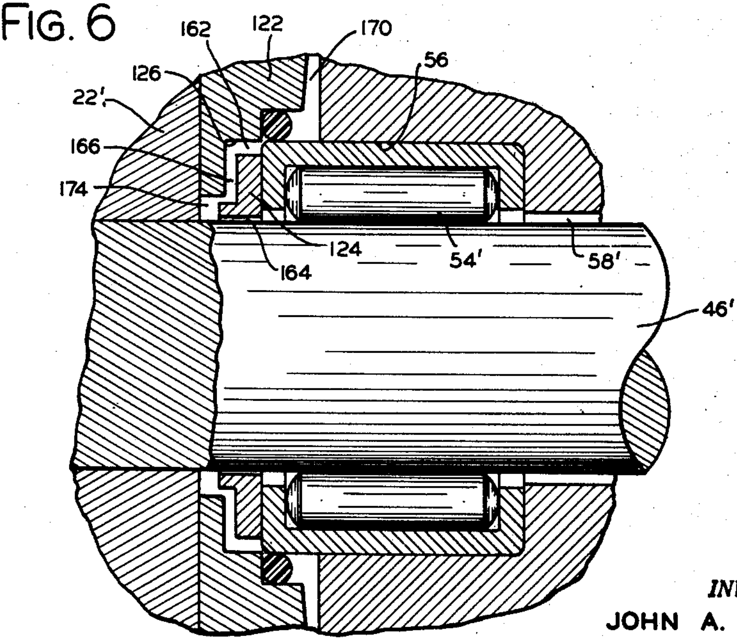
INVENTOR.
JOHN A. LAUCK
BY J. C. Wiesler
ATTORNEY

United States Patent Office 3,156,191 Patented Nov. 10, 1964

3,156,191

SEALING MEANS FOR PUMPS AND MOTORS

John A. Lauck, Benton Harbor, Mich., assignor to Clark Equipment Company, a corporation of Michigan Filed Dec. 23, 1960, Ser. No. 77,975
24 Claims. (Cl. 103—126)

The invention relates to sealing means for pumps and motors, and more particularly to pressure loaded sealing means for fluid pumps and motors.

Until some fifteen years ago, most gear pumps, for example, were of the fixed clearance type; i.e., a type wherein a small operating clearance was provided between the side faces of the gears and the adjacent surfaces of the housing. However, these pumps were never too satisfactory because of inherently low volumetric efficiency. A well-designed gear pump of the fixed clearance type has heretofore had a volumetric efficiency of only about 60 percent at 2,000 p.s.i. This low efficiency is due primarily to the relatively large volume of fluid leakage which flows from the discharge of the pump through the above-mentioned operating clearance, and thence to the inlet along the shafts and through the bearings of the pump.

In an effort to improve efficiency the pressure loaded type pump was developed. In a pressure loaded type pump, of which a gear pump is exemplary, two axially movable thrust plates are held in sealing relationship with the faces of the adjacent gears by pump discharge pressure which is vented to a pressure chamber formed between the pump housing and the adjacent sides of the thrust plates. By using such thrust plates, the volumetric efficiency of a gear pump can be raised to approximately 90 percent at 2,000 p.s.i.

Pressure loaded pumps, while they operate at a much higher volumetric efficiency than fixed clearance pumps, are considerably more complex and more expensive to manufacture and service than are fixed clearance pumps. Further, pressure loaded thrust plates are not feasible for use in fluid motors. For example, if a pressure loaded gear pump were to be used as a fluid motor, it will be appreciated that the thrust plates would function as brakes on the gears whenever the motor was started since the fluid pressure which is applied to run the pump as a motor would also act to force the thrust plates into sealing relation with the gears. Consequently, a pressure loaded fluid motor has inherently high static braking forces to be overcome at starting. Also, any gain in volumetric efficiency during operation of such a fluid motor would be largely offset by a loss of mechanical efficiency due to the considerable drag between the thrust plates and gear faces.

I have conceived a unique construction for use with various types of fluid pumps and motors which is most advantageous in pumps of either a fixed clearance or pressure loaded type, as well as in motors of the fixed clearance type. The disadvantage inherent in both of the above-mentioned pump types, as well as in the above-mentioned motor type, are largely eliminated by means of the present invention which is simple in construction and which provides important advantages over prior constructions.

My invention provides in one form, a wafer-like seal of metal or other non-resilient material having an opening for receiving a shaft. The wafer-like seal is positioned in a chamber formed between one gear face and the shaft supporting bearing. It is spaced from the gear face an amount sufficient to provide a pressure chamber, and is of a diameter which provides substantial peripheral clearance between the seal and the housing or thrust plate, as the case may be. It is held in sealing relationship with the adjacent end of the shaft bearing by pump pressure in the above-mentioned chamber. A controlled small amount of fluid leakage along the shaft for bearing lubrication is allowed by providing a clearance of preferably .0001 to .0006 inch, depending upon the size of the pump or motor, between the shaft and the wafer-like seal. This small clearance also serves to filter the leakage fluid which lubricates the shaft bearing, thus prolonging the life of the bearing.

Difficulty has also been experienced heretofore in attempting to maintain close clearances between metal shafts and seals because of deflection of the shaft in operation resulting in a serious wear and friction problem which tended to destroy the sealing action. This problem was also aggravated as a result of the use of metals as between the shaft and seal having different coefficients of expansion which became an undesirable feature as the operating temperature of the pump or motor increased. My invention avoids the foregoing difficulties while providing controlled bearing lubrication and increasing volumetric efficiency, all by means of a relatively simple construction.

Test results on fixed clearance gear pumps and motors, for example, which embody my invention have shown a volumetric efficiency of from 83 to 85 percent at 2,000 p.s.i. as compared with the aforementioned 60 percent efficiency in such pumps and motors prior to this invention. Application of my invention to pressure loaded gear pumps increases their volumetric efficiency from approximately 90 percent to 95 or 96 percent at 2,000 p.s.i. according to test results.

Significant increases in volumetric efficiency may be effected in the use of my invention not only in the above-mentioned types of pumps and motors, but also, for instance, in vane type pumps and motors, internal-external gear type pumps and motors, and other types of fixed clearance pumps and motors.

Still another advantage of my invention is that it practically eliminates the possibility of loss of substantially all pumping action in pressure loaded type pumps. Previously the sealing sides of the thrust plates of such pumps frequently became scored in operation permitting excessive leakage fluid to build up pressure sufficient to destroy the drive shaft packing seal with consequent loss of substantially all pumping pressure. The present invention avoids this possibility in that loss of the packing seal for any reason does not result in loss of the pump which will continue to function at about 50 percent efficiency.

A principal object of my invention is to provide improved sealing means for fluid pumps and motors of both the fixed clearance and pressure loaded types with resultant increases in efficiency of both such types.

Another important object of the invention is to provide an improved pressure loaded type pump which is capable of continued operation at substantial efficiency despite a loss of packing seals and the like.

Another object of the invention is to provide in pumps and motors of the types contemplated relatively simple, low-cost, and easily assembled structure which provides improved operating characteristics, provides a "fail safe" sealing construction, and avoids shaft deflection and coefficient of expansion problems heretofore encountered.

An important object of the invention is to provide an improved sealing construction for pumps and motors of the types contemplated which also effects controlled lubrication of bearing means in such pumps and motors.

A further object of the invention is to provide non-resilient sealing means for pumps and motors of the types contemplated which controls lubrication to adjacent bearings, and filters the fluid flowing therethrough.

The above and other objects, features and advantages of my invention will become apparent to persons skilled in the art from the following description when taken in conjunction with the accompanying drawings in which:

FIGURE 1 is an axial cross-sectional view showing an intermeshing fixed clearance gear type pump or motor which embodies my invention;

FIGURE 4 is an enlarged fragmentary section of FIGURE 1;

FIGURE 5 is an axial cross-sectional view showing an intermeshing pressure loaded gear pump which embodies my invention;

FIGURE 6 is an enlarged fragmentary section of FIGURE 5; and

Figure 2:
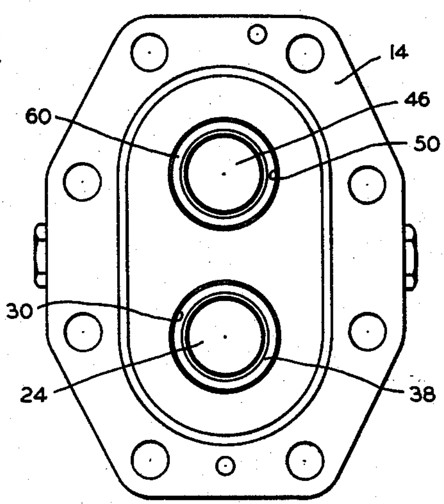
FIGURE 2 is a cross-sectional view taken on line 2—2 of FIGURE 1.
Figure 3:
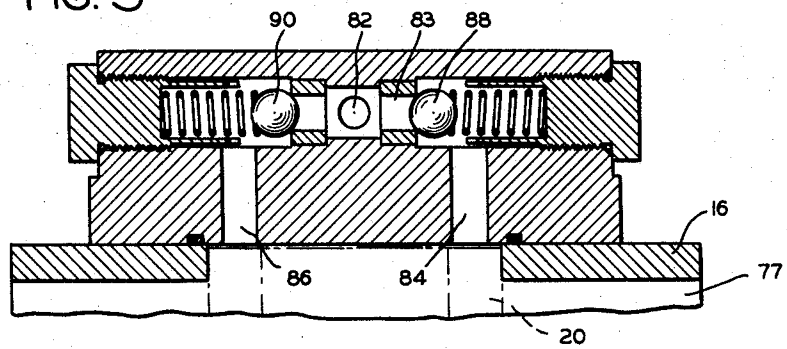
FIGURE 3 is a cross-sectional view taken on line 3—3 of FIGURE 1.

Referring now in detail to FIGURES 1 through 4, the numeral 10 denotes a suitably chambered fixed clearance gear type pump or motor comprising front and rear cover plates 12 and 14 mounted upon an annular central gear body 16 by means of a plurality of bolts, one of which is shown at numeral 18, and located in proper alignment by means of a dowel pin 19. Rotatably mounted in the unit 10 is an idler gear 20 and an intermeshing driving gear 22. Idler gear 20 is supported on a shaft 24 journaled on its left side in a roller bearing 26 and on its right side in a roller bearing 28. Bearing 26 is located in a counterbored recess 30 of a housing chamber 32 and bearing 28 is located in a counterbored recess 34 of a housing chamber 36. An annular wafer seal or seal washer 38 is located on shaft 24 in the counterbore 30 between bearing 26 and gear 20. Another seal washer 44 is similarly located in counterbore 34.

Driving gear 22 is mounted for rotation upon a drive shaft 46 journaled on its left side in a roller bearing 48 which is located in a counterbored recess 50 of a housing chamber 52, and journaled on its right side in a bearing 54 located in a counterbored recess 56 of a housing chamber 58. A pair of seal washers 60 and 66 are located intermediate the side faces of gear 22 and the respective bearings 48 and 54, the same as are seal washers 38 and 44 with respect to gear 20 and bearings 26 and 28. Annular gear body 16 functions as a center housing portion of the unit 10, and also as a spacer member between cover plates 12 and 14 which is machined to provide predetermined operating clearance spaces 69 and 70 between opposite side faces of the gears and the adjacent faces of the cover plates.

A shaft seal retainer 68 having inner and outer sealing O-rings 71 and 72 located thereon is disposed in a counterbore 74 and located by a snap ring 76. A plurality of O-rings are mounted in annular grooves formed in various of the parts of the pump construction, as shown, to provide sealing means.

The housing of unit 10 includes conventional inlet and discharge openings 77, only one of which is shown which communicate with inlet and discharge chambers formed in the housing adjacent opposite sides of the intermeshing teeth of gears 20 and 22. When unit 10 is adapted for use as a pump, fluid enters the inlet opening at suction pressure and is pressurized and conveyed by the gears to the discharge opening for use in any suitable device downstream thereof. When unit 10 is used as a motor, pressurized fluid enters the inlet opening and drives the gears to accomplish useful work, whereupon the fluid is discharged from the housing through the discharge opening.

During operation of unit 10 either as a pump or motor a certain quantity of pressure fluid becomes leakage fluid which flows through gear clearance passages 69 and 70, as indicated by the arrows, into the chambers in which seal washers 38, 44, 60 and 66 are located, and thence is metered in a manner to be described, by said seal washers through the respective bearings 26, 28, 48 and 54 into housing chambers 32, 36, 52 and 58. The metered leakage fluid is then conveyed to the outlet conduit, in the case of a motor, by passage means which communicates housing chambers 32, 36, 52 and 58 with the outlet. A passage 78 connects chambers 58 and 36, the latter chamber being connected to chamber 32 by a passage 80 which extends through shaft 24. Chambers 32 and 52 are interconnected by a passage 82. A transverse passage 83 intersects passage 82 and communicates with a pair of spaced passages 84 and 86 through a pair of spring loaded ball check valves 88 and 90 located in passage 83 on opposite sides of passage 82 (see FIGURE 3). One of the passages 84 and 86 communicates with the inlet side of unit 10 and the other with the discharge side thereof, check valves 88 and 90 functioning to permit reversals in operation of the unit 10 when it is functioning as a motor. Pressure or discharge fluid in either passage 84 or 86, depending upon the direction of rotation of gears 20 and 22, cannot communicate with passage 82 because of the operation of check valve 88 or 90, respectively. Leakage fluid in passage 82, however, causes the check valve opposite to that in the discharge pressure connected passage to open in order to vent leakage fluid to the low pressure side of unit 10. Use of unit 10 as a pump normally eliminates the necessity for check valves 88 and 90 and passages which connect with the discharge side inasmuch as such pumps are not operated normally in both directions of rotation. Consequently only passage means for venting passage 82 to the inlet side of unit 10 are required in most pump applications; likewise in the event that reversal of rotation is not required in any motor application.

Referring now especially to FIGURE 4, which illustrates the upper-left bearing and seal washer portion of FIGURE 1, annular seal washer 60 is of an outer diameter which provides a substantial annular clearance 92 between the wall of counterbore 50 and the outer periphery of the seal washer, and of an inner diameter which provides a metering passage 96 with shaft 46. The clearance 92 permits seal washer 60 to be self-adjusting, i.e., move laterally as shaft 46 deflects so that clearance 96 is maintained thereby avoiding excessive wear between shaft 46 and seal 60 as well as loss of sealing action by seal 60. The seal washer is formed of a cross section to provide chambers 98 and 100 on opposite sides thereof while also providing an outer annular projection 99 adapted to seat in sealing relation with the adjacent end of bearing 48, and an inner annular projection 97 which provides a small clearance passage 94 with the one side of gear 22 and insures a chamber 98 during start-up. Metering passage 96 will preferably vary in dimension from .0001 to .0006 inch, inclusive, depending upon the size of the pump or motor. It permits only a small amount of fluid to flow through the seal 60 for the purpose of lubricating in a controlled manner the bearing 48 and for filtering the fluid flowing therethrough.

Chamber 98 communicates with pressurized fluid by way of clearance passage 69 which is vented to the inlet side in the case of a motor and to the discharge side in the case of a pump. Thus, during operation, projection 99 of seal washer 60 is actuated into sealing relation with bearing 48.

When the unit 10 operates as either a fixed clearance pump or motor, pressure fluid in chamber 98 holds the wafer seal 60 against the bearing 48 in sealing relation. The clearances 92 and 94 eliminate friction and shaft deflection problems that would otherwise be present if there were no clearances and also serve to permit the seal 60 to be self-adjusting. The metering clearance 96 between wafer seal 60 and the shaft 46 permits only a small metered volume of fluid to leak past seal 60 in order to lubricate bearing 48, and also serves to filter such leakage fluid thereby prolonging bearing life.

Referring now to FIGURES 5 and 6, a pressure loaded gear pump 101 is shown. Since the gear pump 101 is generally structurally similar in many respects to the fixed clearance motor or pump 10 shown in FIGURE 1, corresponding parts in FIGS. 5 and 6 are identified by corresponding prime reference numerals of FIGS. 1 through 4. The pressure loaded gear pump comprises a suitably chambered housing portion 102 and a housing cover plate 128 which is secured to the housing 102 by a plurality of bolts, one of which is shown at numeral 130. Rotatably mounted in pump 101 is an idler gear 20′ and an intermeshing driving gear 22′ which are mounted on shafts 24′ and 46′, respectively, and supported in roller bearings 26′, 28′, and 48′, 54′, in generally the same manner as the gears are mounted and supported in the embodiment of FIGURE 1, as indicated by the corresponding numerals. A fixed thrust plate 104 is located on shaft 24′ intermediate the housing 102 and idler gear 20′ and has a counterbore 106 in alignment with the counterbore 30′. A movable and pressure responsive thrust plate 110 is similarly located intermediate cover plate 128 and idler gear 20′ and has a counterbore 112 in alignment with counterbore 34′. An annular wafer seal or seal washer 108 is located on shaft 24′ in the counterbore 106 and is adapted to abut the face of bearing 30′ in sealing relationship. Another seal washer 114 is similarly located in counterbore 112 and abuts bearing 34′. Likewise, a fixed thrust plate 116 is disposed intermediate the side face of gear 22′ and the housing 102 and has a counterbore 120 in alignment with counterbore 50′, while a movable thrust plate 122 is disposed intermediate the other side face of drive gear 22′ and cover plate 128 and has a counterbore 126 therein in alignment with counterbore 56′. Annular wafer seals or seal washers 118 and 124 are located on shaft 46′ in counterbores 120 and 126, respectively, and are adapted to sealingly abut bearings 48′ and 54′.

A shaft seal 132 is located in a counterbored portion 134 of cover plate 128 and is retained in position by a seal retainer member 136 which is held in place by a snap ring 138. A plurality of O-rings are mounted in annular grooves formed in various of the parts of the pump construction, as shown, to provide resilient sealing means, as required.

The pump housing 102 includes conventional inlet and outlet openings 147, only one of which is shown, which communicate with inlet and outlet chambers formed in the pump housing 102 adjacent opposite sides of the intermeshing teeth of gears 20′ and 22′.

During operation of pressure loaded pump 101, a certain quantity of pressure fluid becomes leakage fluid which flows past the side faces of gears 20′ and 22′, as indicated by the arrows, and is metered in a manner to be described by the seal washers through the respective bearings 26′, 28′, 48′ and 54′ into housing chambers 32′, 36′, 52′ and 58′. The metered leakage fluid is then conveyed to the inlet conduit by passage means which communicates housing chambers 32′, 36′, 52′and 58′ with the inlet. A passage 140 connects chambers 58′ and 35′, the latter chamber being connected to chamber 32′ by a passage 80′ which extends through shaft 24′. Chambers 32′ and 52′ are interconnected by a passage 142. Another passage 146 communicates with passage 142 at one end and with the inlet side of the pump 101 at the other end thereof through passages 149 in fixed thrust plates 104 and 116.

Referring now especially to FIG. 6, which illustrates the upper right bearing, movable thrust plate and seal washer portion of FIG. 5, annular seal washer 124 is of an outer diameter which provides a substantial annular clearance 162 between itself and the wall of counterbore 126, and of an inner diameter which provides an annular metering passage 164 with shaft 46′. The seal washer is formed of a cross-section to provide a pressure chamber 166 on the side of the seal washer adjacent the thrust plate 122. Metering passage 164 will preferably vary in dimension from .0001 to .0006 inch, inclusive, depending upon the size of the pump. It permits only a small metered amount of fluid to flow through the seal 124 for the purpose of lubricating in a controlled manner the bearing 54′ and for filtering the fluid flowing therethrough. Chamber 166 receives leakage pressure fluid which passes between the side face of driving gear 22′ and the sealing side of thrust plate 122, so that during operation seal washer 124 is actuated into sealing relation with the end face of bearing 54′. A similar construction and relationship obtains in respect of seal washers 108, 114 and 118, and the bearings and thrust plates associated therewith. Pump discharge pressure chambers 170 and 172 are formed between the inner face of cover plate 128 and the one side of movable thrust plates 122 and 110, respectively, such that communication of said chambers with pump pressure in known manner effects leftward movement of the thrust plates into sealing relation with the adjacent gear faces. A more detailed description of a pressure loaded type gear pump of the general character here contemplated will be found in my U.S. application Serial No. 806,566, filed April 15, 1959, now Patent No. 3,057,303.

It will be noted that substantial annular clearances are provided between the inner diameters of the various fixed and movable thrust plates and the shafts mounting the gears 20′ and 22′, viz, clearances 174 and 176 between thrust plates 122 and 116 and shaft 46′, and clearances 178 and 180 between thrust plates 110 and 104 and shaft 24′. Heretofore, very small clearances have been provided in the areas specified in order to provide a seal between the shafts and the various thrust plates to minimize leakage flow through the bearings. As pointed out previously herein, shaft deflection and coefficient of expansion problems in operation have caused difficulty in the past as a result of such close clearances. The present invention solves this problem in a unique manner while, at the same time, providing a more positive sealing action with respect to the bearings, metering and filtering leakage flow to lubricate the bearings and clean the bearing lubricating fluid, improving pump efficiency, and practically eliminating the possibility of loss of pumping action.

Figure 7:
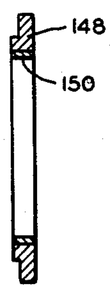
FIGURES 7, 8, 9, 10 and 11 show various modifications of the seal washer configuration of my invention.

FIGURE 7 shows a modification of the wafer seal in which the outer portion 148 is made of a material having a like coefficient of expansion with the shaft and an inner portion 150 of bearing metal. A wafer seal utilizing this type construction will not allow any appreciable change in clearance to occur between the shaft and the wafer seal with changes in temperature thereof.

Figure 8:
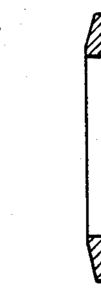

FIGURE 8 shows another form of the wafer seal having a tapered surface 152 which is adapted to form a pressure chamber between the seal and the side face of the gear.

Figure 9:
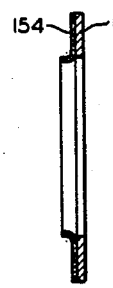

FIGURE 9 shows another modification of the wafer seal which utilizes Teflon or similar material 154 bonded to a metallic disc 156.

Figures 10, 11:
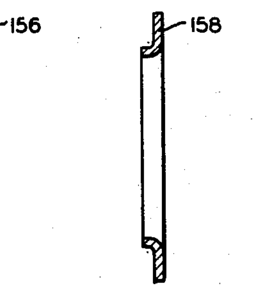

FIGURE 10 shows yet another modification of the wafer seal which is formed as a stamping 158.

FIGURE 11 shows a wafer seal which is formed by using laminated split rings 160 similar to Simplex contracting rings.

From the foregoing it will now be appreciated that in the constructions of both FIGURES 1 and 5, in either of which the seal washer constructions of any of FIGURES 7 through 11 are applicable, each chamber 98 (FIGURE 4) and each chamber 166 (FIGURE 6) is subjected to pump discharge pressure in operation which actuates the respective self-adjusting seal wafer into pressure sealing engagement with the adjacent end of the respective bearing, and that as a consequence the only pressure fluid which can escape from said chambers must flow through the metering annulus provided in each instance, viz, annulus 96 in FIGURE 4 and annulus 164 in FIGURE 6. The size of the metering annulus will vary somewhat depending upon the size of the pump, as pointed out above, but in each event it will be preferably sufficiently small so that only a quantity of fluid sufficient to lubricate the adjacent bearings will flow therethrough, while at the same time such fluid tends to be filtered thereby lengthening the life of said bearings. At the same time, it will be appreciated that the clearances 92 and 96 of FIGURES 1 and 4 and clearances 162, 164 and 174 of FIGURES 5 and 6 solves the problems of shaft deflection and running friction resulting from a different coefficient of expansion of the adjacent metals. In the pressure loaded type pump, as explained hereinabove, some increase in volumetric efficiency is obtained in the use of the present invention, whereas in fixed clearance type pumps and motors the resulting increase in volumetric efficiency in the use of this invention is of such magnitude as to justify in most applications the use of the present simpler and much less costly construction in place of pressure loaded type pumps presently in use. Also, it is extremely important to understand that in the event of loss for any reason of the drive seal shaft 68 of FIGURE 1 and 132 of FIGURE 5 and/or the O-ring seals between the movable thrust plates and the bearings of FIGURE 5, that the pump or motor will continue to function at a significant volumetric efficiency, in the order of about 50 percent, whereas heretofore the occurrence of such a failure resulted in a complete loss of pump pressure which frequently caused serious consequences to machinery being supplied thereby. This advantage results, of course, because pump discharge pressure continues to be applied to the sealing washers and a drop in pressure occurring as a result of a loss of shaft seals does not, therefore, result in a complete loss of pump pressure.

Now although my invention has been disclosed herein with reference to a number of exemplary embodiments and modifications, it will be understood and appreciated that changes in the form, structure and relative arrangement of parts may be made without departing from the field and scope of my invention; for example, the seal washers may be arranged to seal against the motor or pump housing rather than against the shaft bearings, in which case the shaft bearings could be disposed in the housing in axially spaced relation to the seal washers. I intend to include all constructions as fall within the scope of the claims appended.

I claim:

1. In a fluid device having a shaft, bearing means for the shaft and rotatable pressure fluid transfer means mounted on the shaft, non-resilient sealing means mounted on the shaft in spaced relation from the fluid transfer means and movable axially of the shaft, said sealing means defining with the shaft a leakage fluid metering clearance, means conducting pressure fluid from the fluid transfer means to one side of said sealing means and a sealing surface on the bearing means adjacent the other side of said sealing means, said sealing means being actuatable along the shaft into sealing relation with said sealing surface for controlling leakage of pressure fluid along the shaft.

2. In a fluid device having a housing, a shaft, pressure fluid transfer means mounted on said shaft and bearing means mounted in said housing supporting said shaft and fluid transfer means for rotation, non-resilient sealing means mounted on the shaft for movement axially thereof into abutment with a portion of the bearing means, a clearance formed between the sealing means and shaft, and means for conducting pressure fluid to one side of said sealing means to actuate said sealing means into presure sealing relation with said portion of the bearing means for controlling pressure fluid leakage from the fluid transfer means through said clearance and along the shaft.

3. In a fluid device having a housing, a shaft, pressure fluid transfer means mounted for rotation on the shaft and bearing means supporting the shaft, the combination of a sealing element mounted on the shaft for movement axially thereof and forming therewith a fluid metering clearance of predetermined dimension, means conducting pressure fluid from the said fluid transfer means to the side of said sealing means adjacent the fluid transfer means, and a sealing surface adjacent said sealing means on the side thereof remote from the fluid transfer means and cooperable therewith to inhibit the flow of pressure fluid along the shaft upon actuation of said sealing means by the said pressure fluid into abutment with said sealing surface, said metering area conducting a controlled quantity of said pressure fluid to the bearing means for lubricating the bearing means.

4. A fluid device as claimed in claim 3 wherein said sealing element forms with said housing a predetermined clearance permitting deflection of the shaft and radial movement of said sealing element therewith.

5. A fluid device as claimed in claim 3 wherein said sealing surface comprises an end surface of the bearing means.

6. A fluid device as claimed in claim 3 wherein said sealing element is of non-resilient material.

7. A fluid device as claimed in claim 3 wherein said metering clearance has a dimension of .0001 to .0006 inch.

8. For use with a fixed clearance type pump or motor having a housing, a shaft, bearing means for the shaft and pressure fluid transfer means mounted on the shaft and having a predetermined clearance with the housing, the combination of a chamber adjacent one side of the fluid transfer means for receiving pressure leakage fluid flowing through the clearance, annular sealing means mounted in said chamber on the shaft and responsive to said pressure leakage fluid for movement axially of the shaft, a sealing surface on the bearing means forming a portion of said chamber, said sealing means being actuatable into sealing relation with said sealing surface, a metering area formed between said sealing means and the shaft for permitting a controlled amount of pressure leakage fluid to flow from said chamber along the shaft, and a predetermined clearance between the periphery of said sealing means and said chamber means permitting radial movement of said sealing means with radial movement of the shaft.

9. A combination as claimed in claim 8 wherein said sealing means is of non-resilient material.

10. For use with a pressure loaded type pump or motor having a housing, a shaft, pressure fluid transfer means mounted on the shaft and a pressure loadable thrust plate disposed between the housing and the fluid transfer means, annular sealing means mounted on the shaft for movement axially thereof, chamber means in communication with pressure leakage fluid flowing between said fluid transfer means and said thrust plate for receiving said sealing means, a sealing surface in said chamber cooperable with one side of said sealing means upon actuation thereof by said pressure leakage fluid in a direction away from said fluid transfer means for substantially sealing said chamber means, a clearance of predetermined dimension formed between said sealing means and the shaft for metering a small quantity of said leakage fluid therethrough, and a clearance of predetermined dimension formed between said sealing means and said chamber means for permitting radial movement of said sealing means with radial movement of the shaft.

11. A pump or motor as claimed in claim 10 wherein said sealing means is of non-resilient material.

12. In a fluid pump or motor having a housing, a shaft, pressure fluid transfer means mounted on the shaft and bearing means mounted in the housing supporting the shaft for rotation, the combination of non-resilient sealing means mounted on the shaft for movement axially thereof, chamber means within which said sealing means is disposed, a clearance of .0001 to .0006 inch between said sealing means and the shaft for metering pressure fluid therethrough, a clearance between said sealing and said chamber means for permitting radial movement of said sealing means upon radial movement of the shaft, and means conducting pressure fluid to one side of said sealing means for actuating said sealing means into sealing relationship with the bearing means.

13. In a fluid pump or motor having a housing, a shaft, pressure fluid transfer means, a pressure-loadable thrust plate disposed between the housing and the fluid transfer means for sealing one side of the fluid transfer means and bearing means mounted in the housing supporting the shaft for rotation, non-resilient sealing means mounted on the shaft for movement axially thereof, chamber means within which said sealing means is disposed, a clearance of predetermined dimension between said sealing means and the shaft for metering leakage fluid therethrough, and a clearance of predetermined dimension between said sealing means and said chamber means for permitting radial movement of said sealing means upon radial movement of the shaft, pressure leakage fluid flowing between said fluid transfer means and thrust plate being conducted to one side of said sealing means whereby to actuate said sealing means into sealing relation with said bearing means.

14. A fluid pump or motor as claimed in claim 13 wherein said thrust plate has a central opening therethrough which forms with said shaft a substantial clearance.

15. In a fluid pump or motor having a housing, a plurality of bearing means, a pair of shafts journaled in the housing by the bearing means and a pair of intermeshing gears mounted for rotation on the shafts, sealing means comprising chambers in said housing coaxial with each shaft and on each side of said gears, a non-resilient seal member disposed in each chamber and slidably mounted on each shaft, a clearance between each seal member and its respective shaft providing a controlled amount of fluid leakage past each seal member for lubricating the bearing means and a sealing surface on each bearing means cooperable with each seal member upon pressure fluid loading thereof whereby to inhibit fluid leakage flow along the shafts except as provided by each said clearance.

16. In a fluid device having a shaft, bearing means for the shaft and pressure fluid transfer means mounted on said shaft, sealing means comprising a chamber, a non-resilient seal member mounted on the shaft for movement axially thereof and disposed within said chamber, a clearance of predetermined dimension between the shaft and said seal member for permitting a controlled amount of leakage fluid to leak past said seal member, a clearance of predetermined dimension between said seal member and the wall of said chamber for permitting radial movement of said seal member upon radial movement of the shaft, a sealing surface on the bearing means against which said seal member is actuatable and means for conducting pressure fluid to one side of said seal member opposite said sealing surface for holding said seal member in sealing relation with said sealing surface.

17. In a fluid device having a shaft, bearing means for the shaft and pressure fluid transfer means mounted on the shaft, sealing means comprising a chamber adapted to receive pressure leakage fluid from said fluid transfer means, a non-resilient annular sealing element mounted on said shaft for movement axially thereof and disposed within said chamber, and a sealing surface on the bearing means and in said chamber against which said sealing element is actuatable, said sealing element having an inner margin which defines with said shaft a predetermined clearance for allowing a controlled amount of pressure fluid received in said chamber to leak past said sealing element.

18. A fluid device as claimed in claim 17 wherein an annular recess is formed on one surface of said sealing element, said recess receiving pressure leakage fluid from said fluid transfer means which holds said sealing element in sealing relation with said sealing surface.

19. A fluid device as claimed in claim 17 wherein said clearance has a dimension of from .0001 to .0006 inch, inclusive.

20. A fluid device as claimed in claim 17 wherein said sealing element has a stepped surface adjacent said sealing surface.

21. A fluid device as claimed in claim 17 wherein said sealing element has a radially extending tapered surface adjacent said fluid transfer means.

22. A fluid device as claimed in claim 17 wherein said sealing element has a non-resilient portion and a resilient portion secured to said non-resilient portion adjacent said sealing surface.

23. A fluid device as claimed in claim 17 wherein said sealing element comprises a one-piece stamping having an axially extending annular projection disposed toward said fluid transfer means.

24. A fluid device as claimed in claim 17 wherein said sealing element comprises a plurality of laminations.

References Cited in the file of this patent

UNITED STATES PATENTS

| | | |
|---|---|---|
| 1,223,734 | Rinehart | Apr. 24, 1917 |
| 2,176,322 | Barrett | Oct. 17, 1939 |
| 2,283,022 | Wallgren | May 12, 1942 |
| 2,336,294 | Rea | Dec. 7, 1943 |
| 2,527,941 | Lauck et al. | Oct. 31, 1950 |
| 2,548,229 | Mendenhall | Apr. 10, 1951 |
| 2,699,366 | Heinrich | Jan. 11, 1955 |
| 2,881,704 | Murray | Apr. 14, 1959 |
| 2,967,487 | Nageley | Jan. 10, 1961 |
| 3,003,426 | Lauck | Oct. 10, 1961 |